US008697266B2

(12) United States Patent
Muramatsu

(10) Patent No.: US 8,697,266 B2
(45) Date of Patent: Apr. 15, 2014

(54) FUEL CELL SYSTEM AND CONTROL METHOD THEREFOR

(75) Inventor: Yasuyuki Muramatsu, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 1036 days.

(21) Appl. No.: 12/201,217

(22) Filed: Aug. 29, 2008

(65) Prior Publication Data

US 2009/0061269 A1    Mar. 5, 2009

(30) Foreign Application Priority Data

Aug. 30, 2007   (JP) ................. 2007-224726

(51) Int. Cl.
*H01M 12/08*   (2006.01)
*H01M 8/04*    (2006.01)

(52) U.S. Cl.
USPC ............................... 429/9; 429/429

(58) Field of Classification Search
CPC ............................................. H01M 8/04686
USPC ..................... 429/430–432, 9, 429
See application file for complete search history.

(56) References Cited

U.S. PATENT DOCUMENTS

| 5,646,852    | A * | 7/1997 | Lorenz et al. ............... 701/103 |
| 6,387,556    | B1 * | 5/2002 | Fuglevand et al. ............ 429/429 |
| 2003/0113601 | A1 * | 6/2003 | Edlund et al. ................ 429/23 |
| 2004/0202900 | A1 * | 10/2004 | Pavio et al. ................. 429/9 |
| 2004/0207362 | A1 | 10/2004 | Kanouda et al. |
| 2005/0233180 | A1 * | 10/2005 | DeSorbo ....................... 429/9 |
| 2006/0078773 | A1 * | 4/2006 | Speranza et al. ............... 429/23 |
| 2006/0159965 | A1 | 7/2006 | Kibune et al. |
| 2006/0162973 | A1 * | 7/2006 | Harris et al. ................. 180/65.3 |
| 2006/0220609 | A1 | 10/2006 | Konoto et al. |
| 2006/0244421 | A1 * | 11/2006 | Narendran et al. ........... 320/132 |
| 2007/0015018 | A1 | 1/2007 | Tsutsui |
| 2007/0048567 | A1 | 3/2007 | Hisano et al. |
| 2007/0072023 | A1 | 3/2007 | Nakamura et al. |
| 2007/0092764 | A1 | 4/2007 | Kobayashi |
| 2007/0222413 | A1 | 9/2007 | Kinoshita et al. |
| 2007/0248856 | A1 * | 10/2007 | Ueda et al. ................. 429/20 |
| 2008/0303529 | A1 * | 12/2008 | Nakamura et al. ........... 324/433 |
| 2009/0120703 | A1 | 5/2009 | Nagata |

FOREIGN PATENT DOCUMENTS

| JP | 08-119180 A   | 5/1996 |
| JP | 2002-321681 A | 11/2002 |
| JP | 2005-33886 A  | 2/2005 |
| JP | 2005-295705 A | 10/2005 |
| JP | 2006-156003 A | 6/2006 |
| JP | 2006-185777 A | 7/2006 |

(Continued)

*Primary Examiner* — Barbara Gilliam
*Assistant Examiner* — Robert S Carrico
(74) *Attorney, Agent, or Firm* — Keating & Bennett, LLP

(57) ABSTRACT

A fuel cell system is arranged to charge a secondary battery, which is detachable from the fuel cell system, and to supply electric power to a load. The fuel cell system includes a cell stack having a plurality of fuel cells and a controller having a CPU. During power generation in the cell stack, the CPU determines whether or not the secondary battery has been removed from the fuel cell system based on a voltage drop in the cell stack. With the determination that the secondary battery has been removed, the CPU turns off a relay and power supply from the cell stack to the load is stopped. The fuel cell system reliably maintains its operation even after removal of the secondary battery.

16 Claims, 12 Drawing Sheets

(56) References Cited

FOREIGN PATENT DOCUMENTS

| | | |
|---|---|---|
| JP | 2006-196221 A | 7/2006 |
| JP | 2006-199122 A | 8/2006 |
| JP | 2006-310225 A | 11/2006 |
| JP | 2006-310271 A | 11/2006 |
| JP | 2007-28835 A | 2/2007 |
| JP | 2007-66747 A | 3/2007 |
| JP | 2007-69801 A | 3/2007 |
| JP | 2007-83953 A | 4/2007 |
| JP | 2007-259537 A | 10/2007 |
| JP | 2008-21464 A | 1/2008 |
| WO | WO 2006041185 A1 * | 4/2006 |
| WO | WO 2007029473 A1 * | 3/2007 |

* cited by examiner

F I G. 6

WARNING MESSAGE

Charge is not enough.
Do not remove the secondary battery unit.

F I G. 9

FIRST GENERATION-UNDERWAY MESSAGE

Power generation is underway.
Charge is not enough.
Resume charging.

FIG. 10

SECOND GENERATION-UNDERWAY MESSAGE

| Power generation is underway.
Power generation will be stopped in ** seconds. |

F I G. 1 2

STOPPAGE CONFIRMATION MESSAGE

Do you want to stop power
generation right now?

FUEL CELL SYSTEM AND CONTROL METHOD THEREFOR

BACKGROUND OF THE INVENTION

1. Field of the Invention

The present invention relates to a fuel cell system and a control method therefor. More specifically, the present invention relates to a fuel cell system which charges a secondary battery that is detachably provided to the fuel cell system, and a control method therefor.

2. Description of the Related Art

In general, there is known a fuel cell system which supplies a load with electric power from at least one of the fuel cell and a secondary battery charged with power from the fuel cell. JP-A 2004-319367 discloses a technique in which power from a fuel cell is stored in a secondary battery, such as a lithium ion battery, while the power is also used to drive a load.

In the above fuel cell system, if the secondary battery is removed while the fuel cell is generating power, all the power, including the power necessary for driving the load and the power necessary for driving system components which are used to supply the fuel cell with fuel and oxygen, must be covered by the output from the fuel cell.

While the amount of power necessary for driving the system components is substantially constant, the amount of power necessary for driving the load can fluctuate widely depending on how the load is used. Because of this, there is a risk that if the amount of power necessary for driving the load increases after the secondary battery has been removed, it will become impossible to supply enough power for driving the system components. In other words, there has been a risk that the power generation of the fuel cell, i.e., the operation of the fuel cell system, will become unable to be sustained if the secondary battery has been removed. JP-A 2004-319367 does not disclose nor indicate a process or mechanism for performing removal of the secondary battery from the system during power generation by the fuel cell.

SUMMARY OF THE INVENTION

In order to overcome the problems described above, preferred embodiments of the present invention provide a fuel cell system capable of reliably continuing operation even after a secondary battery has been removed, and also provide a control method for the fuel cell system.

According to a preferred embodiment of the present invention, there is provided a fuel cell system which charges a secondary battery detachably provided to the fuel cell system which supplies electric power to a load. The fuel cell system includes a fuel cell, a determination device which determines whether or not the secondary battery has been removed from the fuel cell system during power generation in the fuel cell, and a first controlling device which controls the power supply from the fuel cell to the load based on a result of the determination made by the determination device.

According to another preferred embodiment of the present invention, a controlling method for a fuel cell system which charges a secondary battery detachably provided to the fuel cell system and supplies electric power to a load is provided. The method includes the steps of (a) causing a determination device to determine whether or not the secondary battery has been removed from the fuel cell system during power generation in a fuel cell, and (b) causing a first controlling device to control a power supply from the fuel cell to the load if the step (a) determines that the secondary battery has been removed.

According to the preferred embodiments of the present invention described above, when there is a determination that the secondary battery has been removed during power generation in the fuel cell, electric power supplied from the fuel cell to the load is limited when compared to a case where the secondary battery is attached. In other words, when it is impossible to complement the output of the fuel cell with the secondary battery, a prioritized power supply is provided in which power generation in the fuel cell is used for maintaining the system operation, rather than being supplied to the load. This ensures that the system operation is reliably maintained even after the secondary battery is removed. Therefore, when the secondary battery attached to the fuel cell system has been charged to its full amount, it is now possible to replace the secondary battery with another new secondary battery, and to charge the new secondary battery with the power from the fuel cell, for example.

Preferably, the first controlling device limits the power supplied from the fuel cell to the load to an amount that is not greater than a difference between an amount of power generated by the fuel cell and an amount of power required to maintain power generation in the fuel cell if the determination device determines that the secondary battery has been removed. Such an arrangement ensures that the electric power necessary for maintaining the operation is provided even if the secondary battery is removed during power generation in the fuel cell.

Furthermore, the first controlling device preferably includes a stopping device which stops a power supply from the fuel cell to the load. In this case, the power supply from the fuel cell to the load is stopped if the determination device determines that the secondary battery has been removed. This helps to ensure that the operation is maintained even if the secondary battery is removed during power generation in the fuel cell.

Also, the fuel cell system preferably further includes a time measuring device which measures a waiting time after the determination device determines that the secondary battery has been removed, and a second controlling device which controls a power generation operation in the fuel cell based on a result of a comparison between the waiting time and a predetermined time. In this case, the second controlling device stops power generation in the fuel cell after a lapse of the predetermined time after the determination that the secondary battery has been removed. In other words, if the secondary battery is removed during power generation in the fuel cell and if there is no secondary battery attached before the predetermined time has passed, power generation in the fuel cell will be stopped based on an assumption that there is no need for the fuel cell system to charge secondary batteries. This makes possible to avoid unnecessary power generation, and to thereby save fuel used when the fuel cell generates power.

The fuel cell system preferably further includes a charge amount detection device which detects an amount of charge in the secondary battery, and a setting device which sets the predetermined time based on a result of the detection before removal of the secondary battery by the charge amount detection device. In this case, if the secondary battery is removed during power generation in the fuel cell, a predetermined time is set based on this particular detection made by the charge amount detection device. If the amount of charge in the removed secondary battery is close to fully charged (the amount of charge when the secondary battery is in a state where it is sufficiently charged), a long predetermined time is set based on an assumption that the fuel cell system is going to charge another secondary battery. In the case where there is a high probability that the secondary battery will be replaced, a long predetermined time is set making it possible to provide enough time for the replacement and to thereby prevent unwanted stoppage of the power generation in the fuel cell. On the other hand, if the amount of charge of the removed secondary battery is not close to fully charged, a short predetermined time is set based on an assumption that the secondary battery will be charged by an external power source. As described, in the case where there is a low probability for the fuel cell system to charge a secondary battery, a short predetermined time is set, thereby making it possible to save fuel.

Furthermore, the fuel cell system preferably further includes an input device which allows entry of replacement information that indicates an intention to replace the secondary battery with another secondary battery, and a setting device which sets the predetermined time based on the presence/absence of the replacement information. In this case, if the secondary battery is removed during power generation in the fuel cell, a predetermined time is set based on whether or not there is replacement information. If there has been an input of replacement information, a long predetermined time is set. As described, a long predetermined time is set if the secondary battery is going to be replaced with another. This makes it possible to prevent an unwanted stoppage of power generation in the fuel cell during the replacement of the secondary battery. On the other hand, if there is no replacement information entered, a short predetermined time is set. As described, a short predetermined time is set if the secondary battery is not going to be replaced with another, which makes it possible to save fuel.

The fuel cell system preferably further includes a notifying device which provides a notification that the fuel cell is generating power, from a time when the determination device determined that the secondary battery has been removed to a time when power generation in the fuel cell is stopped. In this case, if the secondary battery is removed during power generation in the fuel cell, there is a notification before the power generation in the fuel cell is stopped that the fuel cell is generating power. It is possible to let an operator know that a secondary battery can be charged, as well as to prompt the operator to charge the secondary battery.

There is known a fuel cell system which drives system components with electric power from a secondary battery and thereby causes the fuel cell to start power generation. Such a fuel cell system shifts to normal operation when it becomes possible to drive the system components by the output power of the fuel cell. If the amount of power in the secondary battery at the time when the operation is started is smaller than an amount of charge (a minimum amount of charge) which is necessary to sustain operations at least until the system makes the shift to normal operation, the amount of charge in the secondary battery is depleted before the shift to normal operation, and it becomes impossible to maintain the operation.

Therefore, the fuel cell system preferably further includes a charge amount detection device which detects an amount of charge in the secondary battery, and a notifying device which provides a notification that charging of the secondary battery is necessary, if the notifying device determines that it is necessary to charge the secondary battery based on a result of determination by the determination device and a result of detection before removal of the secondary battery by the charge amount detection device. In this case, if there is a determination that the secondary battery has been removed during power generation in the fuel cell, and if a result of detection made before the removal of the secondary battery has a smaller value than a predetermined value (the minimum amount of charge), the operator is notified that it is necessary to charge the secondary battery. If the secondary battery which has not been charged to the minimum amount is removed by mistake, this arrangement makes it possible to resume the charging of this particular secondary battery, making sure that the system can shift to normal operation when it is operated next time.

Further, the fuel cell system preferably further includes a charge amount detection device which detects an amount of charge in the secondary battery, a prevention device which prevents removal of the secondary battery from the fuel cell system, an unlocked-state detection device which detects a state where a prevention function by the prevention device is disabled, and a notifying device which provides a notification that the secondary battery should not be removed, if the notifying device determines that the secondary battery should not be removed based on a result of detection by the charge amount detection device and a result of detection by the unlocked-state detection device. In this case, if there is a secondary battery attached, and if there is a determination that the removal prevention function by the prevention device is disabled and the amount of charge in the secondary battery has a smaller value than a predetermined value (the minimum amount of charge), the operator is notified that the secondary battery should not be removed from the fuel cell system. This makes it possible to prevent the operator from mistakenly removing a secondary battery which has not been charged to the minimum amount of charge.

Further, the fuel cell system preferably further includes an instruction device which is used to issue a command for stoppage of power generation in the fuel cell, and a notifying device which provides a notification in order to confirm whether or not the power generation in the fuel cell may be stopped, if the determination device determines that the secondary battery has been removed and if the instruction device has issued a power generation stopping command. In this case, if there are a determination that the secondary battery has been removed during power generation in the fuel cell and a determination that there has been a power generation stop command issued, a notification is made to the operator to check if the power generation in the fuel cell may be stopped. This makes it possible to prevent the operator from mistakenly stopping power generation in the fuel cell.

The determination device preferably includes a detection device which detects information regarding an output of the fuel cell, and determines whether or not the secondary battery has been removed based on a result of the detection made by the detection device. When the secondary battery is removed from the fuel cell system and therefore when the secondary battery is disconnected from the fuel cell, a change takes place in the information regarding the output of the fuel cell (the voltage, for example). Therefore, whether or not the secondary battery has been removed is easily determined by using the change in the information regarding the output of the fuel cell.

Furthermore, the determination device preferably includes an obtaining device which obtains information regarding the secondary battery, and the determination device determines whether or not the secondary battery has been removed based on a result obtained by the obtaining device. Whether or not the secondary battery has been removed is easily determined by using a result obtained by the obtaining device.

Transportation equipment provided with a fuel cell system does not always stop at a place where the secondary battery can be charged by an external power source. For this reason, a stoppage of power generation in the fuel cell after a removal of the secondary battery will make the equipment immovable if the amount of charge in the secondary battery is smaller than the minimum the amount of charge. According to the fuel cell system of the various preferred embodiments of the present invention, power generation in the fuel cell is reliably maintained even if the secondary battery is removed and therefore it is possible to make sure that charging of the secondary battery which has not been charged to the minimum amount will be resumed even if the secondary battery was removed by mistake. Therefore, the fuel cell system according to the preferred embodiments of the present invention can be used suitably in transportation equipment.

Other features, devices, steps, characteristics and advantages of the present invention will become more apparent from the following detailed description of preferred embodiments of the present invention with reference to the attached drawings.

BRIEF DESCRIPTION OF THE DRAWINGS

FIG. 6 is a diagram showing a display example of a warning message.

FIG. 9 is a diagram showing a display example of a first POWER-GENERATION-UNDERWAY message.

FIG. 10 is a diagram showing a display example of a second POWER-GENERATION-UNDERWAY message.

FIG. 12 is a diagram showing a display example of a stoppage confirmation message.

DETAILED DESCRIPTION OF PREFERRED EMBODIMENTS

Hereinafter, preferred embodiments of the present invention will be described with reference to the drawings.

The preferred embodiments described below preferably are directed to a fuel cell system 100 equipped in a motorbike 10 as a non-limiting example of transportation equipment.

The description will first cover the motorbike 10. It is noted that the terms left and right, front and rear, up and down as used in the preferred embodiments of the present invention are determined from the normal state of riding a motorbike, i.e., as viewed by the driver sitting on the seat of the motorbike 10, facing toward a handle 28.

Figure 1:
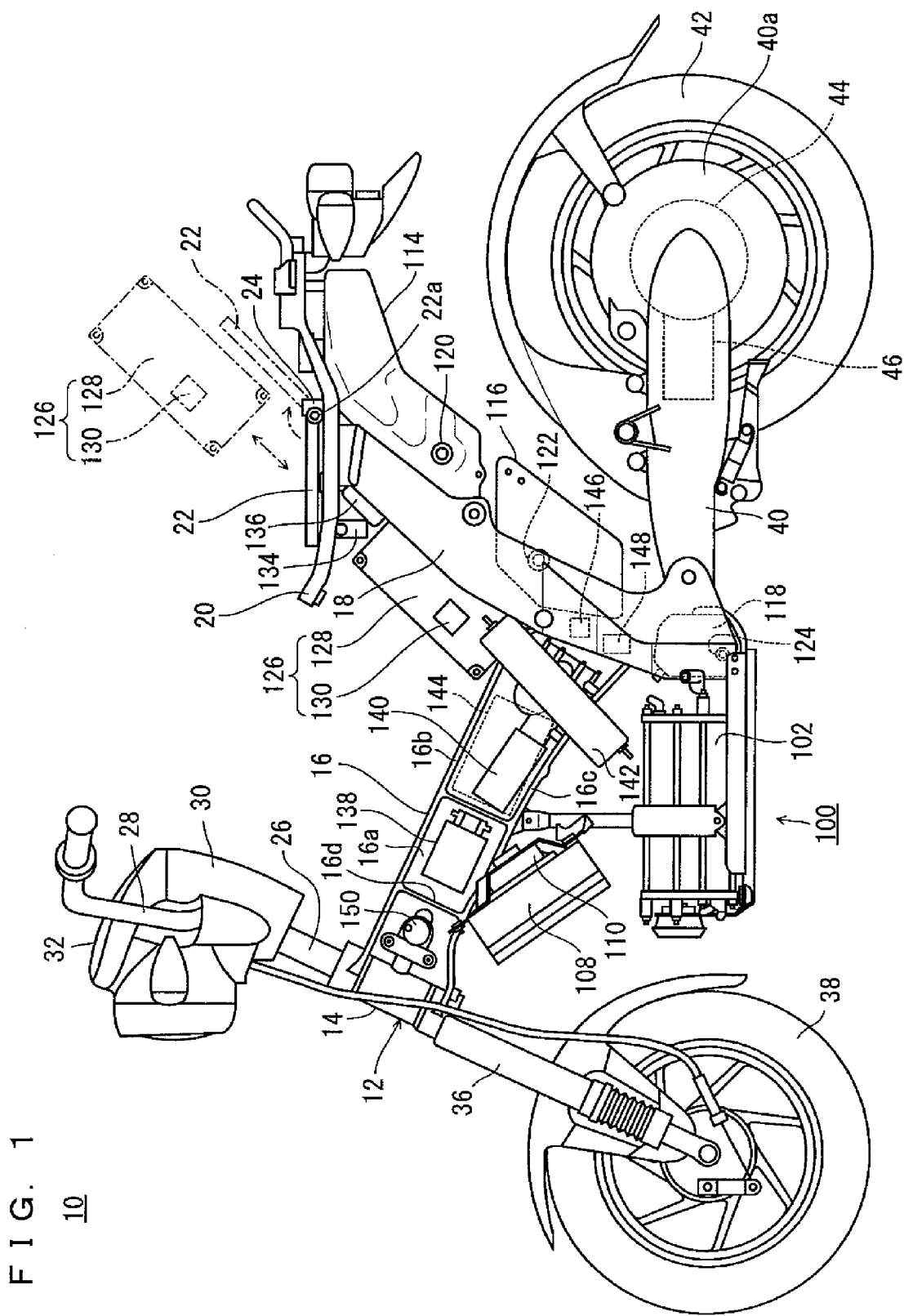
FIG. 1 is a left side view showing a motor bike according to a preferred embodiment of the present invention.

Referring to FIG. 1, the motorbike 10 includes a vehicle frame 12. The vehicle frame 12 includes a head pipe 14, a front frame 16 which has an I-shaped vertical section and extends in a rearward and downward direction from the head pipe 14, and a rear frame 18 which is connected with a rear end of the front frame 16 and rises in a rearward and upward direction.

The front frame 16 includes a plate member 16a which has a width in the vertical direction and extends in a rearward and downward direction, substantially perpendicularly to the lateral direction of the vehicle; flanges 16b and 16c which are arranged respectively at an upper end edge and a lower end edge of the plate member 16a, have a width in the lateral directions, and extend in a rearward and downward direction; and reinforcing ribs 16d protruding from both surfaces of the plate member 16a. The reinforcing ribs 16d and the flanges 16b, 16c serve as compartment walls, providing compartments on both surfaces of the plate member 16a as storage spaces for components of a fuel cell system 100 to be described below.

The rear frame 18 includes a pair of plate members which have a width in the front and rear direction, extend in a rearward and upward direction, and are disposed on the right and left sides to sandwich the rear end of the front frame 16. A frame-shaped seat rail 20 opening in the vertical direction is fixed to upper end portions of the pair of plate members in the rear frame 18. Note that FIG. 1 shows the left side plate member of the rear frame 18.

On the seat rail 20, a lid 22 is provided. The lid 22 has its hinge 22a attached to the seat rail 20, and is thereby openable as well as closable. FIG. 1 shows the lid 22 in a closed state in solid lines and the lid 22 in an open state in dashed lines. The hinge 22a of the lid 22 is provided with an open/close state sensor 24 for detection of the open/closed state of the lid 22.

A steering shaft 26 is pivotably inserted in the head pipe 14. A handle support 30 is provided at an upper end of the steering shaft 26, to which a handle 28 is fixed. A display/operation board 32 is provided on an upper end of the handle support 30.

Figure 3:
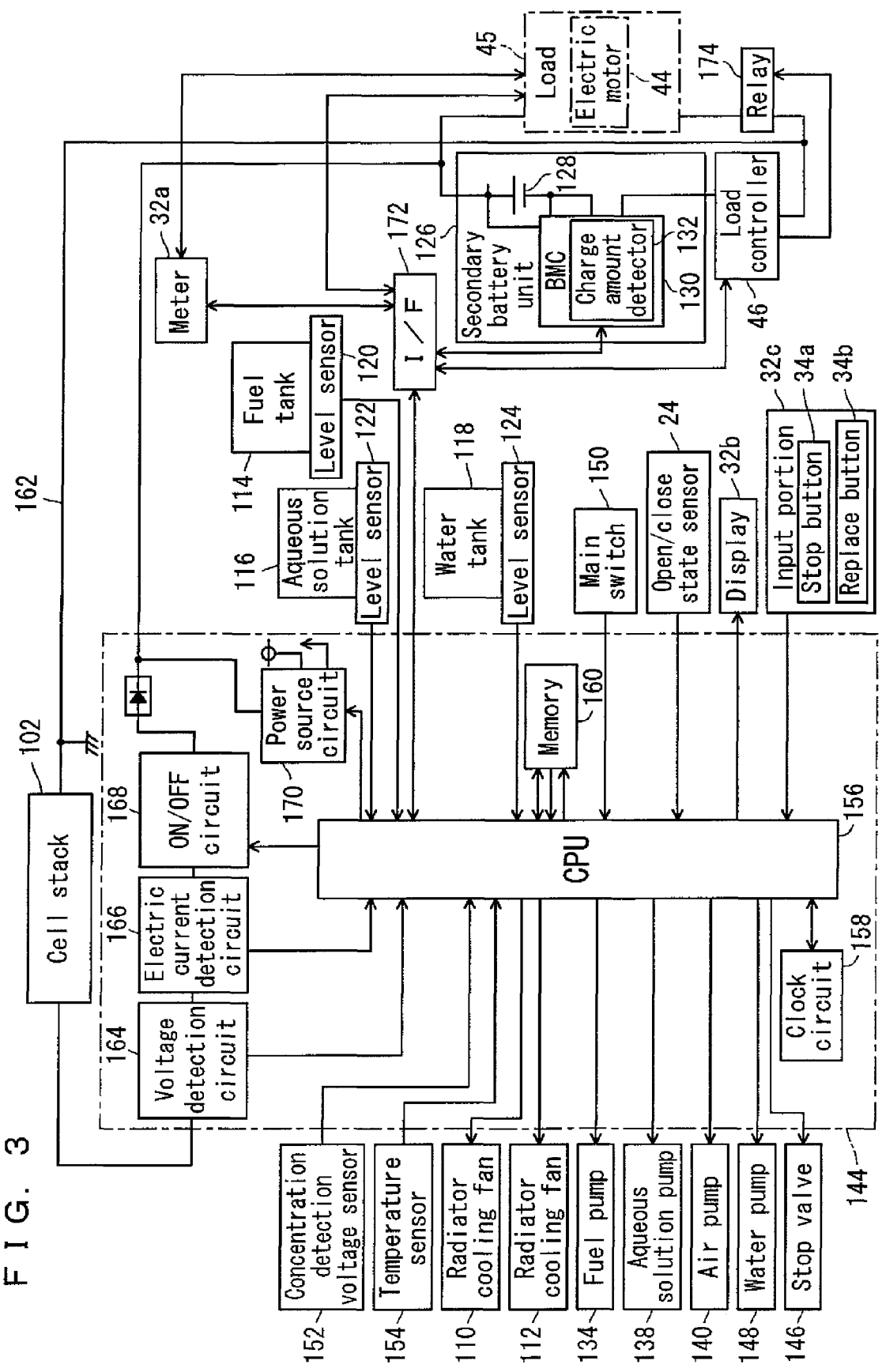
FIG. 3 is a block diagram showing an electrical configuration of a fuel cell system according to a preferred embodiment of the present invention.

Referring also to FIG. 3, the display/operation board 32 is an integrated dashboard including a meter 32a for measuring and displaying various data concerning an electric motor 44 (to be described later), a display 32b (e.g., a liquid crystal display) arranged to provide a variety of information, and an input portion 32c for inputting a variety of commands and information. The input portion 32c includes a stop button 34a for issuing a stop command for stopping power generation in the cell stack 102 (to be described below), and a replace button 34b for an operator (the driver of the motorbike 10 in the present preferred embodiment) to press before replacing a secondary battery unit 126 (to be described below).

As shown in FIG. 1, a pair of left and right front forks 36 is provided at a bottom end of the steering shaft 26. Each of the front forks 36 includes a bottom end which rotatably supports a front wheel 38.

The rear frame 18 includes a lower end which pivotably supports a swing arm 40. The swing arm 40 has a rear end 40a incorporating the electric motor 44 of an axial gap type, for example, which is connected with the rear wheel 42 to drive and rotate the rear wheel 42. Further, the swing arm 40 incorporates a load controller 46 which is electrically connected with a load 45 (see FIG. 3) including the electric motor 44.

The motorbike 10 as described is equipped with a fuel cell system 100, with its constituent members being disposed along the vehicle frame 12. The fuel cell system 100 generates electric energy for driving the load 45, system components, etc.

Hereinafter, the fuel cell system 100 will be described with reference to FIG. 1 and FIG. 2.

The fuel cell system 100 is preferably a direct methanol fuel cell system which uses methanol (an aqueous solution of methanol) directly without reformation, and is arranged to generate electric energy.

The fuel cell system 100 includes a fuel cell stack (hereinafter simply called a cell stack) 102. As shown in FIG. 1, the cell stack 102 is suspended from the flange 16c and is disposed below the front frame 16.

Figure 2:
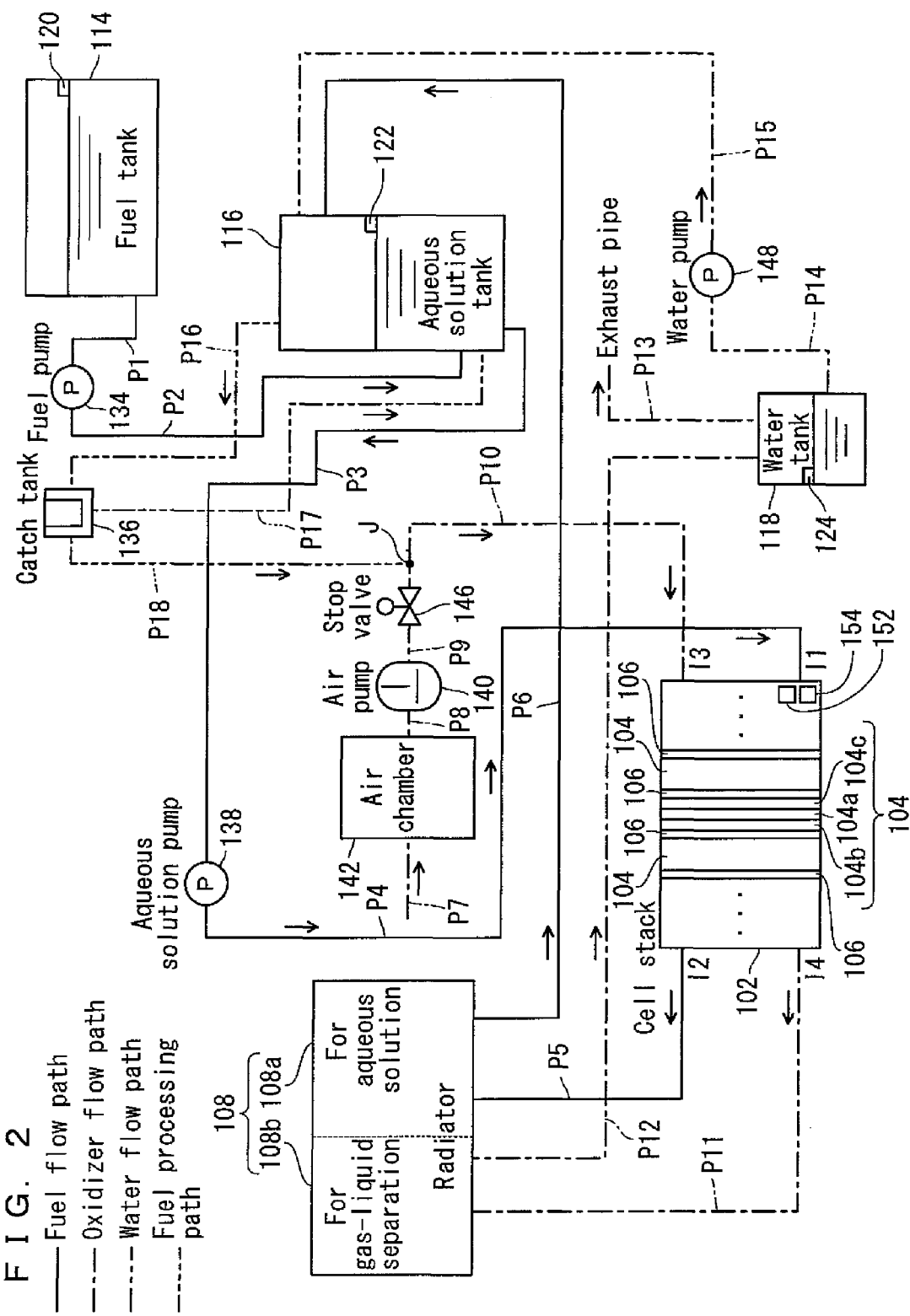
FIG. 2 is a system diagram showing the piping for a fuel cell system in a preferred embodiment of the present invention.

As shown in FIG. 2, the cell stack 102 includes a plurality of fuel cells 104 alternately layered with separators 106. Each fuel cell 104 is capable of generating electric power through electrochemical reactions between hydrogen ions based on methanol and oxygen (oxidizer). Each fuel cell 104 in the cell stack 102 includes an electrolyte film 104a preferably made of a solid polymer film, for example, and a pair of an anode (fuel electrode) 104b and a cathode (air electrode) 104c opposed to each other, with the electrolyte film 104a in between. The anode 104b and the cathode 104c each include a platinum catalyst layer provided on the side closer to the electrolyte film 104a.

As shown in FIG. 1, a radiator unit 108 is disposed below the front frame 16 and above the cell stack 102.

As shown in FIG. 2, the radiator unit 108 includes an aqueous solution radiator 108a and a gas-liquid separation radiator 108b integral with each other. On the rear surface side of the radiator unit 108, a fan 110 for cooling the radiator 108a and a fan 112 (see FIG. 3) for cooling the radiator 108b are provided. The radiators 108a and 108b are disposed in the right-and-left direction, and FIG. 1 shows the fan 110 for cooling the left radiator 108a.

Between the pair of plate members of the rear frame 18, a fuel tank 114, an aqueous solution tank 116, and a water tank 118 are disposed in this order from top to down.

The fuel tank 114 contains a methanol fuel (high concentration aqueous solution of methanol) having a high concentration level (containing methanol preferably at approximately 50 wt %, for example) which is used as fuel for the electrochemical reaction in the cell stack 102. The aqueous solution tank 116 contains aqueous methanol solution which is a solution of the methanol fuel from the fuel tank 114 diluted to a suitable concentration (containing methanol preferably at approximately 3 wt %, for example) for the electrochemical reaction in the cell stack 102. The water tank 118 contains water which is to be supplied to the aqueous solution tank 116.

The fuel tank 114 is provided with a level sensor 120. The aqueous solution tank 116 is provided with a level sensor 122, and the water tank 118 is provided with a level sensor 124. The level sensors 120, 122, and 124 are preferably floating sensors, for example, which detect the height of the liquid surface (liquid level) in the respective tanks.

In front of the fuel tank 114 and above the front frame 16 is a secondary battery unit 126. The secondary battery unit 126 includes a secondary battery 128 and a BMC (Battery Management Controller) 130. The secondary battery 128 stores electric energy generated by the cell stack 102, and supplies the stored electric energy to the electric components in response to commands from a controller 144 (to be described below). The BMC 130 communicates with the controller 144 regarding various information about the secondary battery 128 such as voltage values and electric current values.

Referring also to FIG. 3, the BMC 130 includes a charge amount detector 132. The charge amount detector 132 calculates an amount of charge in the secondary battery 128 by, for example, first detecting a voltage of the secondary battery 128 and then multiplying the voltage by a predetermined constant. The BMC 130 inputs the amount of the charge obtained by the charge amount detector 132 to the controller 144. It should be noted that the amount of the charge may also be detected by accumulating the charging amount and the discharging amount of the secondary battery 128.

The secondary battery unit 126 is preferably attachable to and detachable from the fuel cell system 100. As shown in dashed lines in FIG. 1, the secondary battery unit 126 can be removed from the fuel cell system 100 by opening the lid 22 and pulling the secondary battery unit 126 rearward and upward. It should be noted that a cowl (not shown) is provided below the seat rail 20, covering the rear frame 18, the fuel tank 114, and the secondary battery unit 126. Because of this arrangement, the secondary battery unit 126 is removable only when the lid 22 is opened, and removal of the secondary battery unit 126 is prevented when the lid 22 is closed. In other words, opening the lid 22 disables the removal prevention function for the secondary battery unit 126.

Above the secondary battery unit 126 and inside the seat rail 20, a fuel pump 134 is disposed so as not to interfere with the secondary battery unit 126 when the secondary battery unit 126 is pulled out for removal. Further, above and to the rear of the secondary battery unit 126 and between the pair of plate members of the rear frame 18, a catch tank 136 is disposed so as not to interfere with the secondary battery unit 126 when the secondary battery unit 126 is pulled out for removal.

Further, in the left-hand side storage space of the front frame 16, an aqueous solution pump 138 and an air pump 140 are housed. On the left side of the air pump 140 is an air chamber 142. In the right-hand side storage space of the front frame 16, a controller 144, a stop valve 146, and a water pump 148 are disposed.

Further, a main switch 150 is disposed on the front frame 16 to penetrate the storage space in the front frame 16 from the right-hand side to the left-hand side. Turning on the main switch 150 provides the controller 144 with an operation start command whereas turning off the main switch 150 provides the controller 144 with an operation stop command.

As shown in FIG. 2, the fuel tank 114 and the fuel pump 134 are connected with each other by a pipe P1. The fuel pump 134 and the aqueous solution tank 116 are connected with each other by a pipe P2. The aqueous solution tank 116 and the aqueous solution pump 138 are connected with each other by a pipe P3. The aqueous solution pump 138 and the cell stack 102 are connected with each other by a pipe P4. The pipe P4 is connected with an anode inlet I1 of the cell stack 102. Driving the aqueous solution pump 138 supplies aqueous methanol solution to the cell stack 102.

Near the anode inlet I1 of the cell stack 102, there is provided a voltage sensor 152 arranged to detect concentration information which represents the concentration of the aqueous methanol solution (a ratio of methanol in the aqueous methanol solution) supplied to the cell stack 102 by using electrochemical characteristics of the aqueous methanol solution. The voltage sensor 152 detects an open circuit voltage of the fuel cell 104 to be used as the concentration information, and based on the concentration information, the controller 144 detects the concentration of the aqueous methanol solution supplied to the cell stack 102.

Also, near the anode inlet I1 of the cell stack 102, there is provided a temperature sensor 154 arranged to detect the temperature of the aqueous methanol solution supplied to the cell stack 102, i.e., the temperature of the cell stack 102.

The cell stack 102 and the aqueous solution radiator 108a are connected with each other by a pipe P5. The radiator 108a and the aqueous solution tank 116 are connected with each other by a pipe P6. The pipe P5 is connected with the anode outlet 12 of the cell stack 102.

The pipes P1 through P6 serve primarily as a flow path for the fuel.

The air chamber 142 is connected with a pipe P7. The air chamber 142 and the air pump 140 are connected with each other by a pipe P8. The air pump 140 and the stop valve 146 are connected with each other by a pipe P9. The stop valve 146 and the cell stack 102 are connected with each other by a pipe P10. The pipe P10 is connected with a cathode inlet I3 of the cell stack 102. Driving the air pump 140 with the stop valve 146 opened supplies the cell stack 102 with air from the outside which contains oxygen.

The stop valve 146 is closed when power generation is stopped. This makes it possible to prevent an inflow of air from the outside through the pipe P10 into the cathode inlet I3. Also, this makes it possible to prevent an inflow of water vapor from the cathode inlet 13 to the air pump 140, and thereby prevent rust from forming on the inside of the air pump 140.

The cell stack 102 and the gas-liquid separation radiator 108b are connected with each other by a pipe P11. The radiator 108b and the water tank 118 are connected with each other by a pipe P12. The water tank 118 is connected with a pipe (exhaust pipe) P13. The pipe P11 is connected with a cathode outlet I4 of the cell stack 102. The pipe P13 is provided at an exhaust outlet of the water tank 118 and discharges exhaust from the cell stack 102.

The pipes P7 through P13 serve primarily as a flow path for the oxidizer.

The water tank 118 and the water pump 148 are connected with each other by a pipe P14. The water pump 148 and the aqueous solution tank 116 are connected with each other by a pipe P15.

The pipes P14, P15 serve as a flow path for water.

Further, the aqueous solution tank 116 and the catch tank 136 are connected with each other by pipes P16, P17. The catch tank 136 is connected with a pipe P18. The pipe P18 is connected with a junction J of the pipe P10.

The pipes P16 through P18 serve as a flow path for processing fuel.

Next, reference will be made to FIG. 3 to describe an electric configuration of the fuel cell system 100.

The controller 144 of the fuel cell system 100 preferably includes, for example, a CPU 156, a clock circuit 158, a memory 160, a voltage detection circuit 164, an electric current detection circuit 166, an ON/OFF circuit 168, and a power source circuit 170. The CPU 156 performs necessary calculations and controls operations of the fuel cell system 100. The clock circuit 158 provides the CPU 156 with clock signals for use in measuring time. The memory 160 stores programs, data, calculation data, etc. for controlling the operations of the fuel cell system 100. The memory 160 preferably includes, e.g., an EEPROM. The voltage detection circuit 164 detects a voltage in an electric circuit 162 which connects the cell stack 102 with the secondary battery 128 and the load 45 such as the electric motor 44. The current detection circuit 166 detects an electric current which passes through the electric circuit 162. The ON/OFF circuit 168 opens and closes the electric circuit 162. The power source circuit 170 provides the electric circuit 162 with a predetermined voltage.

The CPU 156 of the controller 144 is supplied with input signals from the main switch 150 and the input portion 32c. The CPU 156 is also supplied with detection signals from the level sensors 120, 122, 124, the voltage sensor 152, and the temperature sensor 154. The CPU 156 is also supplied with voltage detection values from the voltage detection circuit 164 and electric current detection values from the current detection circuit 166. Further, the CPU 156 is supplied with detection signals from the open/close state sensor 24. The open/close state sensor 24 inputs an OFF signal to the CPU 156 when the lid 22 is in its closed state (the state shown in solid lines FIG. 1) and inputs an ON signal to the CPU 156 when the lid 22 is in its open state (the state shown in dashed lines FIG. 1).

The CPU 156 controls system components such as the fuel pump 134, the aqueous solution pump 138, the air pump 140, the water pump 148, the fans 110, 112, and the stop valve 146. In the present preferred embodiment, the system components include devices necessary for maintaining power generation in the cell stack 102. The CPU 156 also controls the display 32b for displaying various kinds of information to the driver. Under the control command from the CPU 156, the display 32b displays a charge rate of the secondary battery 128 (a ratio of the amount of charge to the capacity of the secondary battery 128) as well as various massages, for example.

The CPU 156 is connected with the meter 32a, the load controller 46, and the BMC 130 of the secondary battery unit 126 via an interface circuit 172. The meter 32a is connected with the electric motor 44.

Various data of the electric motor 44 measured by the meter 32a are supplied to the CPU 156 via the interface circuit 172.

The load controller 46 controls the load 45 such as the electric motor 44, as well as a relay switch (hereinafter, simply called relay) 174, under commands from the CPU 156. When turned on, the relay 174 electrically connects the load 45 with the electric circuit 162. On the other hand, when turned off, the relay 174 electrically disconnects the load 45 from the electric circuit 162. In other words, there is no electrical connection between the load 45 and the cell stack 102 when the relay 174 is turned off.

It should be noted that in the present preferred embodiment, the load 45 indicates those devices which consume electric power, other than the system components which are required to maintain power generation in the cell stack 102. Specifically, the load 45 includes such components as the electric motor 44, a headlight of the motorbike 10, a backlight of the display 32b, etc.

The CPU 156 is supplied with various kinds of information regarding the secondary battery 128, such as information about the amount of charge, from the BMC 130 via the interface circuit 172. The CPU 156 calculates the charge rate of the secondary battery 128 based on the amount of charge in the secondary battery 128 sent from the BMC 130.

The secondary battery unit 126 is attached to the fuel cell system 100 between a pair of plate members of the rear frame 18. With this arrangement, the secondary battery unit 126 can be removed from the fuel cell system 100 when it is pulled out from between the pair of plate members.

The secondary battery 128 is attached to and detached from the fuel cell system 100 together with the secondary battery unit 126. As the secondary battery unit 126 is removed from the fuel cell system 100, the secondary battery 128 becomes disconnected from the electric circuit 162 while it becomes connected with the electric circuit 162 as the secondary battery unit 126 is attached to the fuel cell system 100.

The secondary battery 128 complements the output from the cell stack 102 by being charged with electric energy from the cell stack 102 and by discharging the electric energy to supply power to the load 45, the system components, etc. The secondary battery 128 is connectable with an external power source, such as a commercial power source, via the BMC 130. The secondary battery 128 is connectable with the external power source, and is chargeable by the external power source whether the secondary battery 128 is attached to the fuel cell system 100, i.e., the motorbike 10 or it is detached from the motorbike 10.

The memory 160 stores programs for executing processes in FIG. 4, FIG. 5, FIG. 7, FIG. 8, and FIG. 11 and various flags including a replacement indicator flag. The replacement indicator flag represents a piece of information indicating whether or not the driver intends to replace the secondary battery unit 126 (the secondary battery 128). When the replacement indicator flag is turned on, it means that the driver intends to replace the secondary battery unit 126. When the replacement indicator flag is turned off, the driver does not intend to replace the secondary battery unit 126. The replacement indicator flag is turned off when the operation is started, and it is turned on when the replace button 34b is pressed by the driver continuously for five seconds, for example. In other words, pressing the replace button 34b inputs replacement information which indicates that the driver intends to replace the secondary battery unit 126.

In the present preferred embodiment, the voltage detection circuit 164 preferably defines the detection device. The determination device preferably includes the CPU 156 and the voltage detection circuit 164. The first controlling device preferably includes the CPU 156 and the relay 174. The relay 174 preferably defines the stopping device. The time measuring device preferably includes the CPU 156 and the clock circuit 158. The notifying device preferably includes the display 32b and the CPU 156. The CPU 156 also functions as the second controlling device and the setting device. The charge amount detector 132 preferably defines the charge amount detection device. The replace button 34b preferably defines the input device. The stop button 34a preferably defines the instruction device. The lid 22 preferably defines the prevention device. The open/close state sensor 24 preferably defines the unlocked-state detection device.

Next, a description will be made with respect to a basic power generation operation in the fuel cell system 100.

When the main switch 150 is turned ON, the fuel cell system 100 starts the controller 144 and commences its operation. Then, as the charge rate of the secondary battery 128 becomes lower than a predetermined amount (about 40%, for example) in the course of supplying power to the load 45, electric power from the secondary battery 128 is used to start driving the system components such as the aqueous solution pump 138 and the air pump 140. In other words, the fuel cell system 100 automatically starts power generation when the charge rate becomes lower than a predetermined value. Thereafter, the power generation in the cell stack 102 is automatically stopped when the secondary battery 128 is fully charged (a charge of about 98%, for example). The charge rate which triggers the start of power generation (about 40% in this preferred embodiment) is set to a charge rate (hereinafter called the minimum charge rate) which represents a minimum necessary charge from the start time of power generation to the time the system shifts to normal operation.

Referring to FIG. 2, as the aqueous solution pump 138 is driven, aqueous methanol solution in the aqueous solution tank 116 is sent via the pipes P3, P4 and the anode inlet I1, directly to the anode 104b in each of the fuel cells 104 included in the cell stack 102.

Meanwhile, when the air pump 140 is driven, air is introduced via the pipe P7, into the air chamber 142 where it is silenced. Then, the air, etc. which is provided to the air chamber 142 flows through the pipe P8 and into the air pump 140 and then, through the pipe P9, the stop valve 146, the pipe P10 and the cathode inlet I3, and is supplied to the cathode 104c in each of the fuel cells 104 included in the cell stack 102.

Carbon dioxide, vaporized methanol, water vapor, etc. included within the aqueous solution tank 116 are supplied via a pipe P16 to the catch tank 136. The methanol vapor and water vapor are cooled in the catch tank 136, and the aqueous methanol solution obtained in the catch tank 136 is returned via the pipe P17 to the aqueous solution tank 116. On the other hand, carbon dioxide, non-liquefied methanol, and water vapor, etc. in the catch tank 136 flow through the pipe P18 and the junction J, and into the pipe P10. The carbon dioxide, non-liquefied methanol, and water vapor, etc., passed into the pipe P10 from the catch tank 136 are supplied to the cathode 104c in each of the fuel cells 104 as is the air from the outside.

At the anode 104b of each fuel cell 104, methanol and water in the supplied aqueous methanol solution chemically react with each other to produce carbon dioxide and hydrogen ions. The produced hydrogen ions flow to the cathode 104c via the electrolyte film 104a, and electrochemically react with oxygen in the air supplied to the cathode 104c, to produce water (water vapor) and electric energy. In other words, power generation is performed in each of the fuel cells 104, i.e., in the cell stack 102. The temperature of the cell stack 102 is increased due to the heat associated with the various reactions. The output of the cell stack 102 increases as the temperature rises, and the cell stack 102 becomes able to perform constant power generation at approximately 60° C.

When a temperature of the cell stack 102 is not lower than approximately 60° C., the fuel cell system 100 becomes able to provide the amount of power, etc., necessary to drive the system components such as the aqueous solution pump 138 and the air pump 140, with the output from the cell stack 102. In other words, it becomes possible to shift to normal operation when the cell stack 102 attains a temperature not lower than approximately 60° C.

Carbon dioxide produced at the anode 104b in each fuel cell 104 and aqueous methanol solution which includes unused methanol are heated in association with the electrochemical reactions. The carbon dioxide and the aqueous methanol solution flow from the anode outlet I2 of the cell stack 102, through the pipe P5 into the radiator 108a where they are cooled, then flow through the pipe P6 and return to the aqueous solution tank 116. The cooling of the carbon dioxide and the aqueous methanol solution which contains un-used methanol by the radiator 108a is facilitated by driving of the fan 110.

Meanwhile, most of the water vapor produced on the cathode 104c in each fuel cell 104 is liquefied and discharged in the form of water from the cathode outlet I4 of the cell stack 102, with saturated water vapor being discharged in the form of gas. The water vapor which was discharged from the cathode outlet I4 is supplied via the pipe P11 to the radiator 108b, cooled in the radiator 108b, and a portion of the water vapor is liquefied as its temperature decreases to or below the dew point. The liquefying operation of the water vapor by the radiator 108b is facilitated by operation of the fan 112. Exhaust from the cathode outlet I4, which contains water (liquid water and water vapor), carbon dioxide and unused air, is supplied via the pipe P11, the radiator 108b and the pipe P12, to the water tank 118 where water is collected, and thereafter, exhaust which contains water vapor, carbon dioxide and un-used air is discharged to the outside via the pipe P13.

At the cathode 104c in each fuel cell 104, the vaporized methanol from the catch tank 136 and methanol which has moved to the cathode 104c due to crossover reaction with oxygen in the platinum catalyst layer, thereby being decomposed into harmless substances of water and carbon dioxide. The water and carbon dioxide which are produced by decomposition of the methanol are discharged from the cathode outlet I4, and supplied to the water tank 118 via the radiator 108b. Further, water which has moved due to water crossover to the cathode 104c in each fuel cell 104 is discharged from the cathode outlet I4, and supplied to the water tank 118 via the radiator 108b.

The water in the water tank 118 is supplied appropriately by a pumping operation of the water pump 148, through the pipes P14, P15 to the aqueous solution tank 116. The CPU 156 controls the water pump 148 based on detection signals from the level sensor 122, to maintain the aqueous methanol solution in the aqueous solution tank 116 at a predetermined level.

Methanol fuel in the fuel tank 114 is supplied to the aqueous solution tank 116 by operation of the fuel pump 134, via the pipes P1, P2. The CPU 156 controls the fuel pump 134 based on the concentration detected by using the voltage sensor 152 so that the aqueous methanol solution in the aqueous solution tank 116 is maintained at a predetermined concentration.

Figure 4:
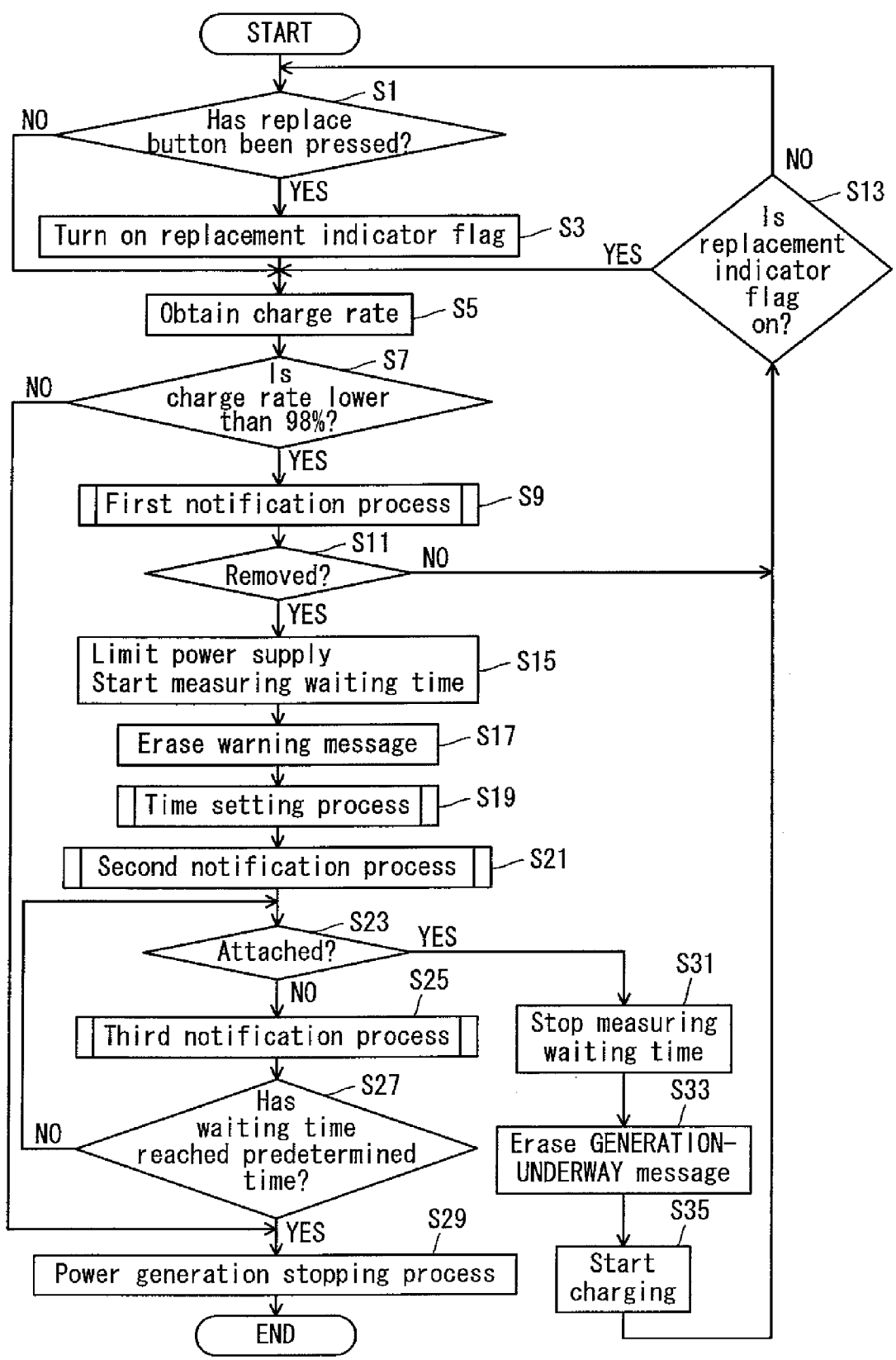
FIG. 4 is a flowchart showing an example of a main operation of a fuel cell system according to a preferred embodiment of the present invention.

Next, description will cover an example of a normal operation of the fuel cell system 100, with reference to FIG. 4, etc. Assume that at the time the process in FIG. 4 is started, the secondary battery unit 126 (the secondary battery 128) is attached to the frame 12, i.e., the fuel cell system 100, and the system is in normal operation. In other words, the process in FIG. 4 is started after the system has attained a state where power generation can be sustained with power generated by the cell stack 102 (fuel cells 104) alone. Specifically, the process is started when the amount of power generated in the cell stack 102 has become not smaller than the amount of power consumed by the system components (when the NET output becomes not smaller than zero). Another possible arrangement may be that the process is started when a result of detection by the temperature sensor 154 becomes not lower than a predetermined temperature. Assume also, that at the time the process in FIG. 4 is started, the replacement indicator flag stored in the memory 160 is in the OFF state.

As shown in FIG. 4, when Step S1 determines that the replace button 34b in the input portion 32c has been pressed by the driver continuously for five seconds, for example, the CPU 156 turns on the replacement indicator flag which is stored in the memory 160 (Step S3). Then, the CPU 156 calculates the charge rate of the secondary battery 128 using the amount of charge detected by the charge amount detector 132, and stores the calculated value of the charge rate in the memory 160. In other words, the charge rate of the secondary battery 128 is obtained (Step S5). When Step S1 does not determine that the replace button 34b is pressed continuously, the process skips Step S3 and goes to Step S5. In this case, therefore, the replacement indicator flag is still in the OFF state.

Subsequently, the CPU 156 checks whether or not the charge rate obtained in Step S5 is lower than about 98%, for example (Step S7). In other words, the CPU 156 checks whether or not the secondary battery 128 is at a fully charged state. If the charge rate of the secondary battery 128 is lower than about 98%, the process goes to a first notification process in FIG. 5 (Step S9).

Figure 5:
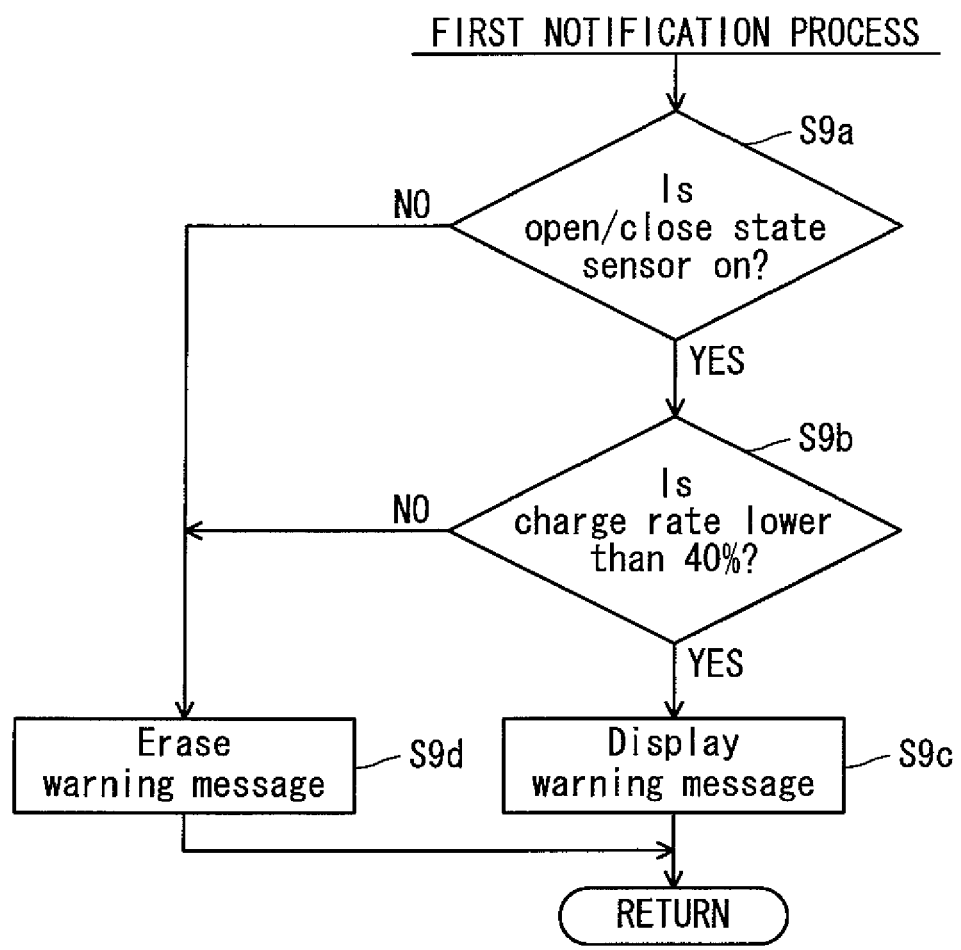
FIG. 5 is a flowchart showing an example of a first notification process.

Referring to FIG. 5, in the first notification process, first, determination is made as to whether or not the open/close state sensor 24 is in an ON state (Step S9a). In other words, a determination is made whether or not the driver has opened the lid 22. If Step S9a determines that an ON signal has been entered from the open/close state sensor 24 (i.e., if the lid 22 is open), the process determines whether or not the charge rate obtained in Step S5 is lower than about 40%, for example (Step S9b). If the charge rate is lower than about 40%, the CPU 156 causes the display 32b to display a warning message such as that shown in FIG. 6 (Step S9c). Specifically, the CPU 156 causes the display 32b to display a warning message which reads, for example, "Charge is not enough. Do not remove the secondary battery unit." In other words, when the lid 22 is open but the charge rate of the secondary battery 128 is lower than a minimum charge rate, the CPU 156 determines that the secondary battery unit 126 should not be removed, and the determination is notified to the driver. Thereafter, the system returns to the process in FIG. 4. On the other hand, if the open/close state sensor 24 is not in the ON state, the system returns to the process in FIG. 4 without displaying a warning message. If there is already a warning message displayed, the warning message is erased (Step S9d) before the system returns to the process in FIG. 4. The same procedure is followed in the case when the charge rate is not lower than about 40%, for example.

Subsequently, the CPU 156 determines whether or not the secondary battery unit 126 has been removed from the fuel cell system 100 (Step S11). The voltage across the cell stack 102 increases when the cell stack 102 is disconnected from the secondary battery 128. This phenomenon is utilized in Step S11, where the CPU 156 checks a detection result from the voltage detection circuit 164 and determines whether or not the secondary battery unit 126 has been removed. Specifically, the CPU 156 determines that the secondary battery unit 126 has been removed if the voltage of the cell stack 102 has increased from approximately 25 V (volts) to approximately 40 V, for example. If Step S11 does not determine that the secondary battery unit 126 has been removed, the process goes to Step S13 to determine whether or not the replacement indicator flag has been turned on. If the replacement indicator flag is not in the ON state, the process returns to Step S1, whereas if the replacement indicator flag is in the ON state, the process returns to Step S5.

If Step S11 determines that the secondary battery unit 126 has been removed from the fuel cell system 100, then power supply from the cell stack 102 to the load 45 is limited.

In this step, the CPU 156 turns off the relay 174 to electrically disconnect the load 45 from the cell stack 102. This stops power supply from the cell stack 102 to the load 45. Meanwhile, based on clock signals from the clock circuit 158, the CPU 156 starts measuring a waiting time which is an amount of time from the determination that the secondary battery unit 126 has been removed (Step S15).

Subsequently, if there is a warning message displayed on the display 32b, the warning message is erased from the display 32b (Step S17). Then, the system goes to a time setting process (Step S19) shown in FIG. 7.

Figure 7:
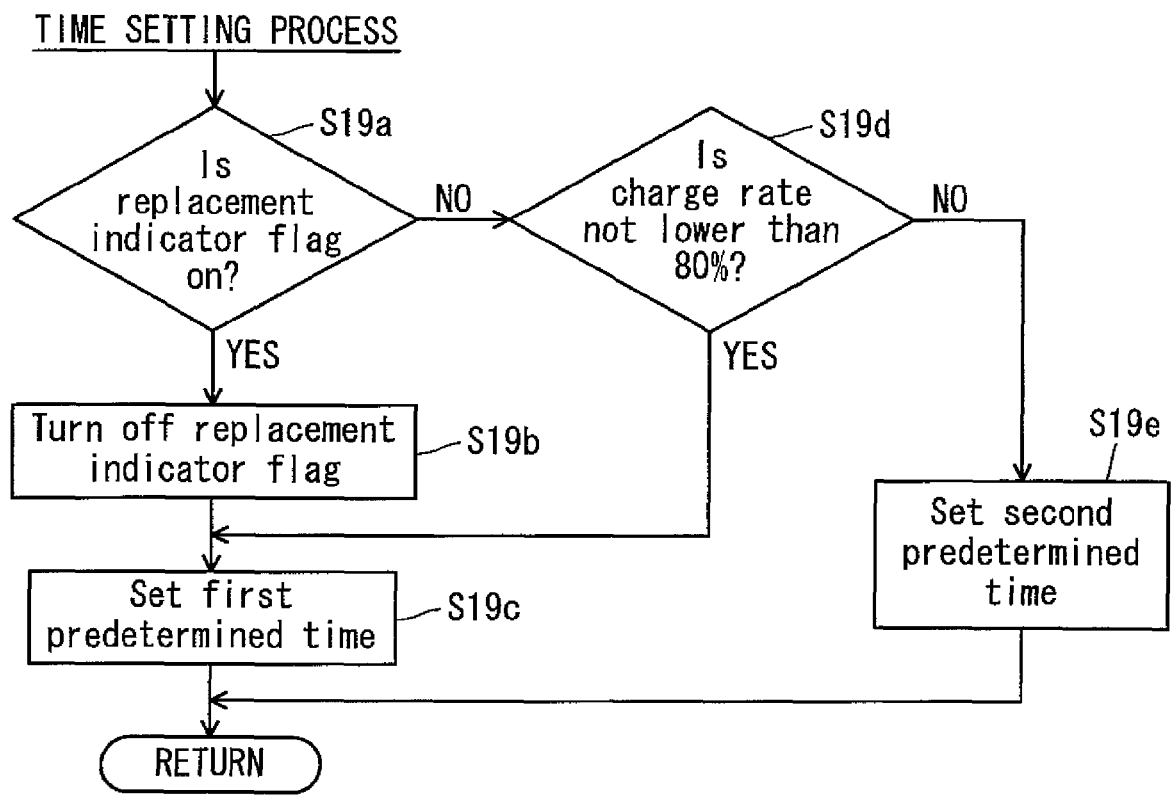
FIG. 7 is a flowchart showing an example of a time setting process.

Referring to FIG. 7, the CPU 156 determines whether or not the replacement indicator flag stored in the memory 160 is in the ON state (Step S19a). If Step S19a determines that the replacement indicator flag is turned on, the CPU 156 turns off the replacement indicator flag (Step S19b), and sets a first predetermined time (about ten seconds in this example) as a time from the moment of determination that the secondary battery unit 126 has been removed to the moment that the power generation will be stopped (Step S19c). On the other hand, if Step S19a determines that the replacement indicator flag is turned off, the system checks whether or not the charge rate obtained in Step S5 is not lower than about 80% (Step S19d). If the charge rate is not lower than about 80%, the process goes to Step S19c. On the other hand, if Step S19d determines that the charge rate is lower than about 80%, the CPU 156 sets a second predetermined time (about five seconds in this example) which is a shorter time than the first predetermined time, as a time from the moment of determination that the secondary battery unit 126 has been removed to the moment that the power generation will be stopped (Step S19*e*). Then, the system returns to the process in FIG. 4.

Subsequently, the system goes to a second notification process (Step S21) shown in FIG. 8.

Figure 8:
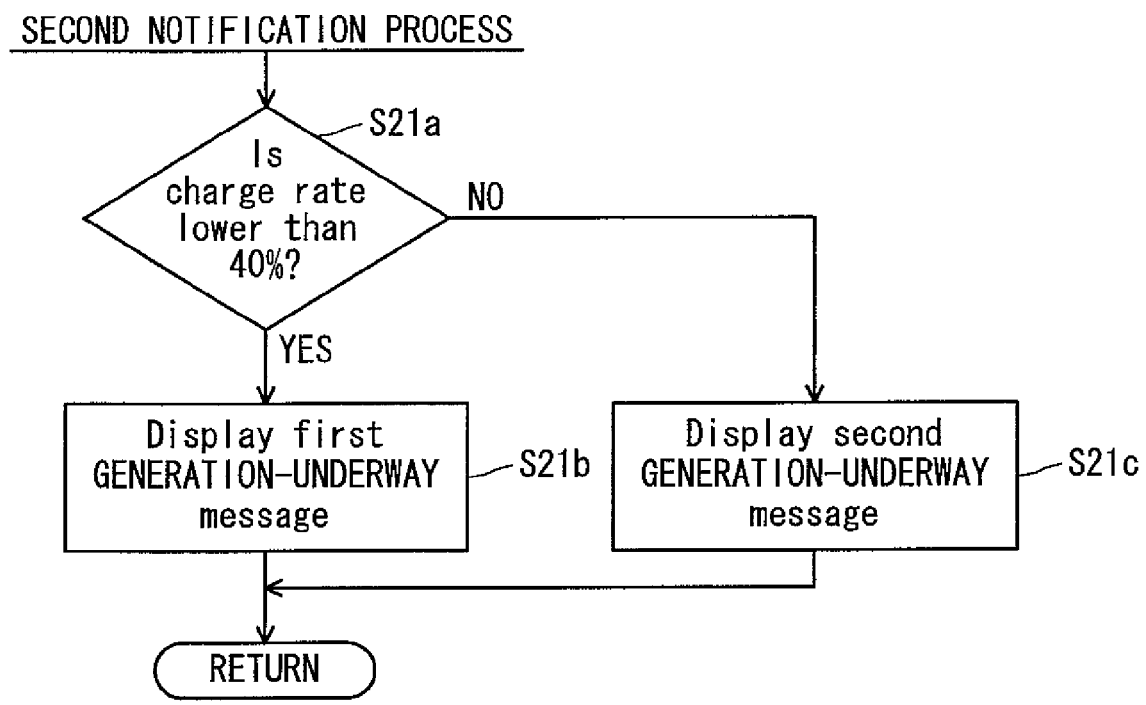
FIG. 8 is a flowchart showing an example of a second notification process.

Referring to FIG. 8, in the second notification process, first, the CPU 156 determines whether or not the charge rate obtained in Step S5 is lower than about 40%, for example (Step S21*a*). If the charge rate is lower than about 40%, the CPU 156 causes the display 32*b* to display a first POWER-GENERATION-UNDERWAY message in FIG. 9 (Step S21*b*). Specifically, the CPU 156 causes the display 32*b* to display such a message as "Power generation is underway. Charge is not enough. Resume charging". In other words, when the charge rate of the secondary battery 128 in the removed secondary battery unit 126 is lower than a minimum charge rate, the CPU 156 determines that the charging of the secondary battery 128 is necessary, and the fact that the cell stack 102 is generating power and charging of the secondary battery 128 is necessary is notified to the driver. On the other hand, if the charge rate is not lower than about 40%, for example, the CPU 156 causes the display 32*b* to display a second POWER-GENERATION-UNDERWAY message in FIG. 10 (Step S21*c*). Specifically, the CPU 156 causes the display 32*b* to display such a message as "Power generation is underway. Power generation will be stopped in  seconds". Then, the system returns to the process in FIG. 4. It should be noted that the "" in the second POWER-GENERATION-UNDERWAY message represents a count-down figure, which decreases with the time measurement. Specifically, in the case where the first predetermined time is set in Step S19*c* (see FIG. 7), "" is a difference between the first predetermined time and the waiting time which is being measured whereas it is a difference between the second predetermined time and the waiting time which is being measured in the case where the second predetermined time is set in Step S19***e* (see FIG. 7).

Refer to FIG. 4 now. Thereafter, in Step S23, the system determines whether or not a secondary battery unit 126 is attached to the fuel cell system 100. In this step, the CPU 156 determines that a secondary battery unit 126 has been attached if the voltage of the cell stack 102 has decreased from approximately 40 V to approximately 25 V, for example. If there is no secondary battery unit 126 attached, the process goes to a third notification process shown in FIG. 11 (Step S25).

Figure 11:
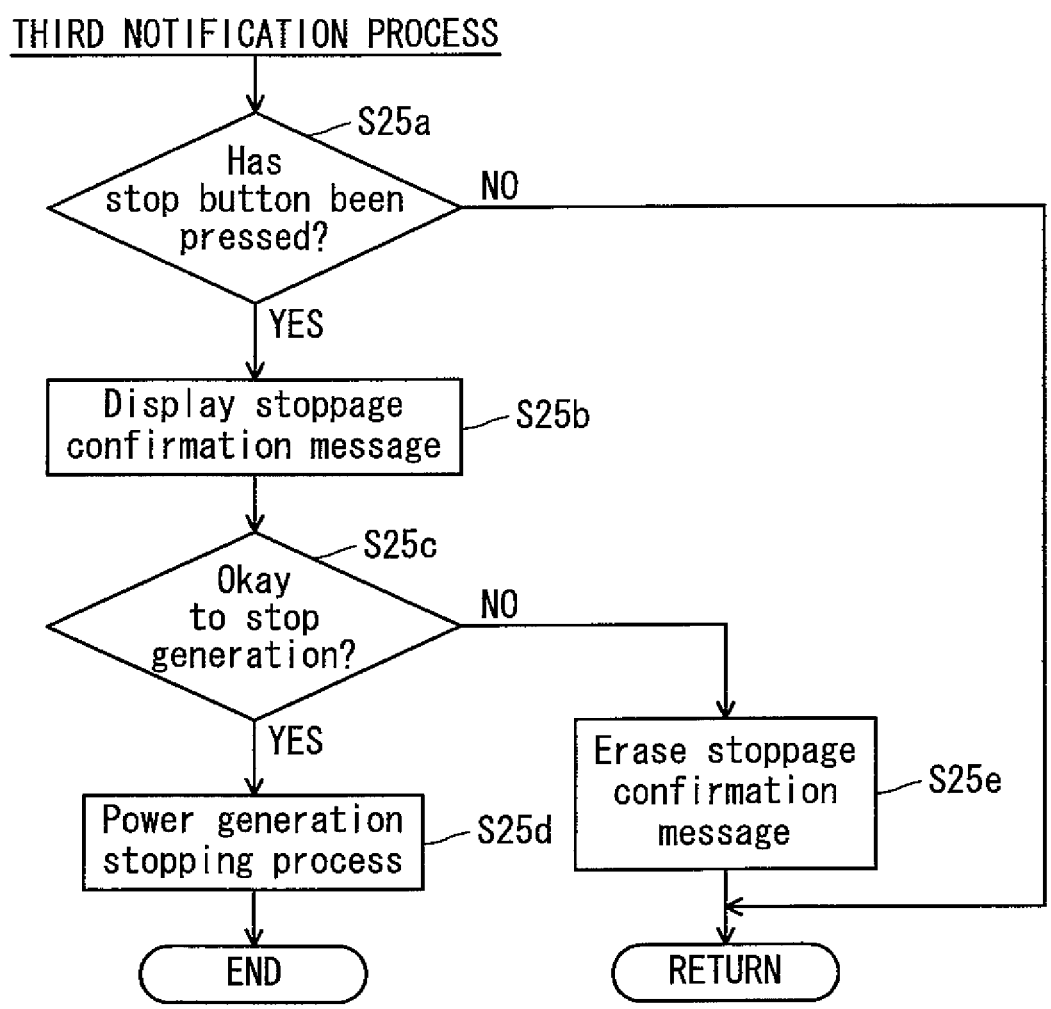
FIG. 11 is a flowchart showing an example of a third notification process.

Referring to FIG. 11, in the third notification process, first, the CPU 156 determines whether or not the stop button 34*a* has been pressed (Step S25*a*). If the stop button 34*a* has not been pressed, the system goes back to the process in FIG. 4. If the stop button 34*a* has been pressed, the CPU 156 causes the display 32*b* to display a stoppage confirmation message in FIG. 12 (Step S25*b*). Specifically, the CPU 156 causes the display 32*b* to display such a message as "Do you want to stop power generation right now?" Thereafter, determination is made whether or not the power generation may be stopped (Step S25*c*). For example, if the stop button 34*a* is pressed again, the system determines that the power generation in the cell stack 102 may be stopped, then performs a power generation stopping process (Step S25*d*), and stops the normal operation. On the other hand, the system determines that the power generation should not be stopped if, for example, a cancel button (not shown) on the input portion 32*c* is pressed in Step S25*c*. Then the system erases the stoppage confirmation message from the display 32*b* (Step S25*e*), and goes back to the process in FIG. 4.

Subsequently, the process goes to Step S27, where the system performs a power generation stopping process if the current waiting time has reached the predetermined time which was set in Step S19*c* or S19*e* (Step S29), and stops the normal operation. In the power generation stopping process, operations of the system components are stopped whereby power generation in the cell stack 102 is stopped while power generation messages, such as the POWER-GENERATION-UNDERWAY message, are erased from the display 32*b*. If Step S27 determines that the waiting time has not reached the predetermined time, the process returns to Step S23.

If Step S23 determines that the voltage of the cell stack 102 has decreased from approximately 40 V to approximately 25 V, for example, and therefore determines that the secondary battery unit 126 has been attached, the CPU 156 stops the measurement of the waiting time, and resets the waiting time (Step S31). Then, the POWER-GENERATION-UNDERWAY message which was put on the display in Step S21*b* or S21*c* (see FIG. 8) is erased from the display 32*b* (Step S33), and charging of the newly attached secondary battery 128 in the secondary battery unit 126 is started (Step S35). Thereafter, the process returns to Step S13.

If Step S7 determines that the charge rate of the secondary battery 128 is not lower than about 98%, for example, the process goes to Step S29, performs a power generation stopping process and stops the normal operation. In other words, if the secondary battery 128 is fully charged, a power generation stopping process is performed and the normal operation is stopped.

According to the fuel cell system 100 as described above, power supply from the cell stack 102 to the load 45 is limited to reliably secure an amount of power necessary to maintain power generation in the cell stack 102 if the CPU 156 determines that the secondary battery unit 126 has been removed, i.e., the secondary battery 128 has been removed, during power generation in the cell stack 102. Therefore, operation can be maintained reliably even after the secondary battery unit 126 is removed.

When the waiting time, which is the amount of time from the moment of determination that the secondary battery 128 has been removed, has reached a predetermined time, the system determines that there is no need for charging the secondary battery 128 and so the power generation in the cell stack 102 is stopped, which makes it possible to avoid unnecessary power generation, and to save methanol fuel.

If the replacement indicator flag is ON or the charge rate of the removed secondary battery 128 is close to the full charge (not lower than about 80% in the present example), the CPU 156 determines that another secondary battery which will replace the previous secondary battery 128 is to be charged by the fuel cell system 100, and therefore sets a longer predetermined time (the first predetermined time: about 10 seconds in this example). As described, in the case where there is a high probability that the secondary battery 128 will be replaced, a long predetermined time is set to provide enough time for the replacement, making it possible to prevent unwanted stoppage of power generation of the cell stack 102 during the replacement of the secondary battery unit 126.

On the other hand, if the replacement indicator flag is OFF and the charge rate of the removed secondary battery 128 is relatively small (lower than about 80% in this example), the CPU 156 determines that the secondary battery 128 will be charged by an external power source such as a commercial power source, and set a short predetermined time (the second predetermined time: about five seconds, in the present example). As described, in the case where there is a low probability for the secondary battery 128 to be charged by the fuel cell system 100, a short predetermined time is set, making it possible to save methanol fuel.

When determination has been made that the secondary battery 128 is removed, it is then possible to display the first or the second POWER-GENERATION-UNDERWAY message on the display 32b thereby letting the operator know that it is now possible to charge a secondary battery 128, as well as prompting the driver to charge the secondary battery 128.

If the charge rate of the removed secondary battery 128 is lower than the minimum charge rate (about 40% in the present example), the first POWER-GENERATION-UNDERWAY message is displayed on the display 32b to request that the secondary battery unit 126 which has been removed by mistake be put back in order to resume the charging of the secondary battery 128. This makes sure that the system can reliably shift to normal operation using the secondary battery 128 the next time the system is operated.

If the lid 22 is open and the charge rate of the secondary battery 128 is lower than a minimum charge rate, a warning message against removal is displayed on the display 32b, whereby it is possible to prevent the operator from removing the secondary battery unit 126 by mistake.

If the secondary battery 128 has been removed and the stop button 34a is pressed, a stoppage confirmation message is displayed on the display 32b, whereby it is possible to prevent the operator from stopping power generation in the cell stack 102 by mistake. Also, after the stoppage confirmation message is displayed, the operator can, for example, press the stop button 34a again to stop power generation in the cell stack 102. This improves driver convenience.

The voltage of the cell stack 102 is utilized to determine whether or not the secondary battery 128 has been removed from the fuel cell system 100. This eliminates the need to provide a separate sensor, etc., making it possible to simplify the constitution of fuel cell system 100.

Even if the secondary battery unit 126 is removed by mistake, it is now possible to reliably put back the removed secondary battery unit 126 and resume charging of the secondary battery 128 of the secondary battery unit 126. Therefore, the fuel cell system 100 can be utilized suitably in the motorbike 10 which may not always have access to power from an external power source at a place where it makes a stop.

It should be noted that in the above-described preferred embodiments, power supply from the cell stack 102 to the load 45 is preferably stopped in Step S15 in FIG. 4. However, the preferred embodiments of the present invention are not limited to this. For example, power which is supplied from the cell stack 102 to the load 45 may be limited to an amount which is not greater than the difference (electrical power difference) between the amount of power generated by the cell stack 102 and the amount of power necessary for maintaining the power generation by the cell stack 102 (i.e., the amount of power consumed by the system components). In other words, power is supplied to the load 45 within a range where the system can continue to drive the system components. In this case, the electric power difference is calculated by using the voltage detection circuit 164, the electric current detection circuit 166, the CPU 156, etc. Then, the load controller 46 limits the amount of power consumable by the load 45 to not greater than the calculated power difference, and thereby limits the power supply to the load 45. In this case, the first controlling device preferably includes the load controller 46, the voltage detection circuit 164, the electric current detection circuit 166, the CPU 156, etc. The electric circuit 162 may be provided with a limiting circuit in order to limit the cell stack 102 not to supply the load 45 with an amount of power exceeding the identified power difference.

In the process shown in FIG. 4, description was made for a case where the voltage of cell stack 102 is preferably used as information regarding the output of fuel cell 104, and a determination is preferably made whether or not the secondary battery 128 has been removed based on this information. However, the preferred embodiments of the present invention are not limited to this.

For example, the voltage and current of cell stack 102 may be used to calculate the resistance and electrical power, and these may be used as the basis for determination. As another example, the voltage of fuel cell 104 in the cell stack 102 may be detected for use in the determination. Further, the determination may be made using information regarding the secondary battery 128 obtained from the BMC 130. Specifically, the CPU 156 determines that the secondary battery 128 is attached if the CPU 156 can communicate with the BMC 130 and can receive information from the BMC 130. On the other hand, the CPU 156 determines that the secondary battery 128 is removed if the CPU 156 cannot communicate with the BMC 130 and cannot receive information from the BMC 130. In this case, the BMC 130 defines the obtaining device, while the determination device includes the BMC 130 and the CPU 156. Other possible variations may be inclusion of a proximity sensor for example, of a high-frequency oscillation type, a magnetic type, a capacitance type, or of other types in order to detect attaching/detaching of the secondary battery unit 126. In this case, the sensor is included in the determination device. Such an arrangement as the above also enables easy determination as to whether or not the secondary battery 128 has been removed from the fuel cell system 100.

Further, in the above-described preferred embodiments, description was made for a case where the secondary battery unit 126, which includes the secondary battery 128 and the BMC 130, is attached to and detached from the fuel cell system 100. Obviously, however, there may be an arrangement that only the secondary battery 128 is attached to and detached from the fuel cell system 100.

In the above-described preferred embodiments, description was made for a case where the display/operation board 32 includes the display 32b and the input portion 32c. However, the display/operation board may be of a touch-panel type. This simplifies the display/operation board configuration.

In the preferred embodiments described above, description was made for a case where methanol is preferably used as the fuel, and aqueous methanol solution is used as the aqueous fuel solution. However, the preferred embodiments of the present invention are not limited to this, and the fuel may be provided by another alcohol based fuel such as ethanol, and the aqueous fuel solution may be provided by an aqueous solution of the alcohol, such as an aqueous ethanol solution.

Also, the preferred embodiments of the present invention are also applicable to fuel cell systems mounted with a reformer, and hydrogen fuel cell systems where fuel cells are supplied with hydrogen gas fuel.

Further, the preferred embodiments of the present invention are applicable to stationary type fuel cell systems and further, to portable type fuel cell systems for personal computers, portable devices, and other electronic appliances.

It should be noted here that the fuel cell system according to the preferred embodiments of the present invention can be used not only in motorbikes but also in any other transportation equipment such as automobiles, marine vessels, etc.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A fuel cell system arranged to charge a secondary battery that is detachable from the fuel cell system and to supply electric power to a load, the fuel cell system comprising:
   a fuel cell;
   system components necessary to maintain power generation in the fuel cell;
   a determination device arranged to determine whether or not the secondary battery has been removed from the fuel cell system during a period of power generation in the fuel cell;
   a first controlling device programmed to control a power supply from the fuel cell to the load based on a result of the determination made by the determination device;
   a time measuring device arranged to measure a waiting time starting at a time when the determination device determines that the secondary battery has been removed; and
   a second controlling device programmed to stop a power generation operation in the fuel cell when the measured waiting time reaches a predetermined time; wherein
   the first controlling device is programmed to prioritize supplying power to the system components to ensure that an amount of power required to maintain the power generation in the fuel cell is supplied to the system components and that the power supplied to the load is always an amount not greater than a difference between an amount of power generated by the fuel cell and the amount of power required to maintain the power generation in the fuel cell, if the determination device determines that the secondary battery has been removed.

2. The fuel cell system according to claim 1, wherein the first controlling device includes a stopping device arranged to stop the power supply from the fuel cell to the load.

3. The fuel cell system according to claim 1, further comprising:
   a charge amount detection device arranged to detect an amount of charge in the secondary battery; and
   a setting device arranged to set the predetermined time based on a detection by the charge amount detection device before removal of the secondary battery.

4. The fuel cell system according to claim 1, further comprising:
   an input device arranged to input replacement information which indicates an intention to replace the secondary battery with another secondary battery; and
   a setting device arranged to set the predetermined time based on a presence or an absence of the replacement information.

5. The fuel cell system according to claim 1, further comprising a notifying device arranged to provide a notification that the fuel cell is generating power from the time when the determination device determines that the secondary battery has been removed to a time when power generation in the fuel cell is stopped.

6. The fuel cell system according to claim 1, further comprising:
   a charge amount detection device arranged to detect an amount of charge in the secondary battery; and
   a notifying device arranged to provide a notification that charging of the secondary battery is necessary if the notifying device determines that it is necessary to charge the secondary battery based on the result of determination by the determination device and a result of detection by the charge amount detection device before removal of the secondary battery.

7. The fuel cell system according to claim 1, further comprising:
   a charge amount detection device arranged to detect an amount of charge in the secondary battery;
   a prevention device arranged to prevent a removal of the secondary battery from the fuel cell system;
   an unlocked-state detection device arranged to detect a state where a prevention function by the prevention device is disabled; and
   a notifying device arranged to provide a notification that the secondary battery should not be removed if the notifying device determines that the secondary battery should not be removed based on a result of detection by the charge amount detection device and a result of detection by the unlocked-state detection device.

8. The fuel cell system according to claim 1, further comprising:
   an instruction device arranged to issue a command to stop power generation in the fuel cell; and
   a notifying device arranged to provide a notification to confirm whether or not the power generation in the fuel cell may be stopped if the determination device determines that the secondary battery has been removed and if the instruction device has issued a power generation stopping command.

9. The fuel cell system according to claim 1, wherein the determination device includes a detection device arranged to detect information regarding an output of the fuel cell; and the determination device determines whether or not the secondary battery has been removed based on a result of detection made by the detection device.

10. The fuel cell system according to claim 1, wherein the determination device includes an obtaining device arranged to obtain information regarding the secondary battery, and the determination device determines whether or not the secondary battery has been removed based on a result obtained by the obtaining device.

11. Transportation equipment comprising the fuel cell system according to claim 1.

12. A controlling method for a fuel cell system arranged to charge a secondary battery that is detachable from the fuel cell system and to supply electric power to a load, the method comprising the steps of:
   (a) causing a determination device to determine whether or not the secondary battery has been removed from the fuel cell system during power generation in a fuel cell;
   (b) causing a first controlling device to prioritize supplying power to system components of the fuel cell system necessary to maintain power generation in the fuel cell to ensure that an amount of power required to maintain the power generation in the fuel cell is supplied to the system components and that a power supply from the fuel cell to the load is always an amount not greater than a difference between an amount of power generated by the fuel cell and the amount of power required to maintain the power generation in the fuel cell, if the step (a) determines that the secondary battery has been removed; and
   (c) causing a second controlling device to stop power generation in the fuel cell after a lapse of a predetermined time from a starting time when a determination is made in the step (a) that the secondary battery has been removed.

13. The controlling method for a fuel cell system according to claim 12, further comprising the step of:
   (d) causing a notifying device to provide a notification that the fuel cell is generating power before the power generation in the fuel cell is stopped if the step (a) determines that the secondary battery has been removed.

14. The controlling method for a fuel cell system according to claim 12, further comprising the steps of:
   (d) causing a charge amount detection device to detect an amount of charge in the secondary battery; and
   (e) causing a notifying device to provide a notification that charging of the secondary battery is necessary if the step (a) determines the secondary battery has been removed and if the step (d) determines that a result of detection by the charge amount detection device before the removal of the secondary battery has a smaller amount of charge than a predetermined amount of charge.

15. The controlling method for a fuel cell system according to claim 12, further comprising the steps of:
   (d) determining whether or not a prevention device is preventing a removal of the secondary battery from the fuel cell system;
   (e) causing a charge amount detection device to detect an amount of charge in the secondary battery; and
   (f) causing a notifying device to notify that the secondary battery should not be removed from the fuel cell system if the step (d) determines that a prevention function by the prevention device is disabled and if the step (e) determines that a result of detection by the charge amount detection device has a smaller amount of charge than a predetermined amount of charge.

16. The controlling method for a fuel cell system according to claim 12, further comprising the steps of:
   (d) determining whether or not there has been issuance of a command for stopping power generation in the fuel cell; and
   (e) causing a notifying device to provide a notification confirming if power generation in the fuel cell is stopped if the step (a) determines that the secondary battery has been removed and if the step (d) determines that a power generation stop command has been issued.

* * * * *